United States Patent
Nathan

(10) Patent No.: US 6,557,483 B2
(45) Date of Patent: May 6, 2003

(54) VEHICLE TRAILER HITCH FLAG DISPLAY APPARATUS

(76) Inventor: Philip A. Nathan, 4115 14th Ave. West, Bradenton, FL (US) 34205

( * ) Notice: Subject to any disclaimer, the term of this patent is extended or adjusted under 35 U.S.C. 154(b) by 0 days.

(21) Appl. No.: 09/880,378

(22) Filed: Jun. 13, 2001

(65) Prior Publication Data

US 2002/0189525 A1 Dec. 19, 2002

(51) Int. Cl.$^7$ ................................ B60D 1/40
(52) U.S. Cl. ................ 116/28 R; 33/264; 116/173
(58) Field of Search ................ 116/28 R, 173, 116/35 R, 42, 409; 40/590, 591; 403/408.1, 384, 388; 280/432; 33/264

(56) References Cited

U.S. PATENT DOCUMENTS

| | | | |
|---|---|---|---|
| 1,279,669 A | | 9/1918 | Deming |
| 1,564,703 A | | 12/1925 | Nichols |
| 1,928,563 A | | 9/1933 | Hetzel |
| 2,533,837 A | | 12/1950 | Pauley |
| 3,493,203 A | | 2/1970 | Gualano |
| 3,643,902 A | | 2/1972 | Gualano |
| 3,715,821 A | * | 2/1973 | Hawes ................ 116/173 |
| 3,866,328 A | * | 2/1975 | Alexander et al. ........ 33/264 |
| 4,054,302 A | * | 10/1977 | Campbell ............... 280/477 |
| 4,375,134 A | * | 3/1983 | Sheetz ................. 116/173 |
| 4,574,726 A | * | 3/1986 | Sullivan ............... 116/28 R |
| 4,601,255 A | * | 7/1986 | Marcotti ............... 116/173 |
| 4,632,354 A | | 12/1986 | Asciutto |
| 4,650,147 A | | 3/1987 | Griffin |
| 4,676,414 A | | 6/1987 | Deguevara |
| 4,955,577 A | | 9/1990 | Ching |
| 5,024,179 A | * | 6/1991 | Leffel ................. 116/173 |
| 5,039,056 A | | 8/1991 | Paxton |
| 5,205,446 A | | 4/1993 | Greenberg |
| 5,524,857 A | * | 6/1996 | Eisenberg et al. ........ 116/173 |
| 5,558,352 A | | 9/1996 | Mills |
| 5,669,621 A | | 9/1997 | Lockwood |
| 5,680,706 A | | 10/1997 | Talcott |
| 5,727,497 A | * | 3/1998 | Nichols, Jr. ............ 116/173 |
| 5,732,927 A | | 3/1998 | Purpura |
| 5,899,167 A | | 5/1999 | Furman |
| 6,042,136 A | | 3/2000 | Heinecke |
| 6,085,687 A | | 7/2000 | Chester |
| 6,318,747 B1 | * | 11/2001 | Ratican ............... 116/28 R |
| 6,357,780 B1 | * | 3/2002 | Young ................. 224/448 |

* cited by examiner

Primary Examiner—Diego Gutierrez
Assistant Examiner—Tania Courson
(74) Attorney, Agent, or Firm—Charles J. Prescott

(57) ABSTRACT

A detachable vehicle trailer hitch display flag apparatus, the trailer hitch of the type having a removable towing ball. The apparatus comprises an elongated, preferably tubular flagstaff having a display flag attached or releasably attachable to an upper end portion thereof and an elongated straight support shaft adapted at a lower end thereof to be releasably attachable to the trailer hitch in upwardly extending and upright orientation in place of the towing ball when it is removed. A lower end of the flagstaff is slidably engageable over the support shaft in coaxial upwardly extending alignment with the support shaft. A releasable locking arrangement holds the flagstaff and the support shaft together while the apparatus is in use.

4 Claims, 3 Drawing Sheets

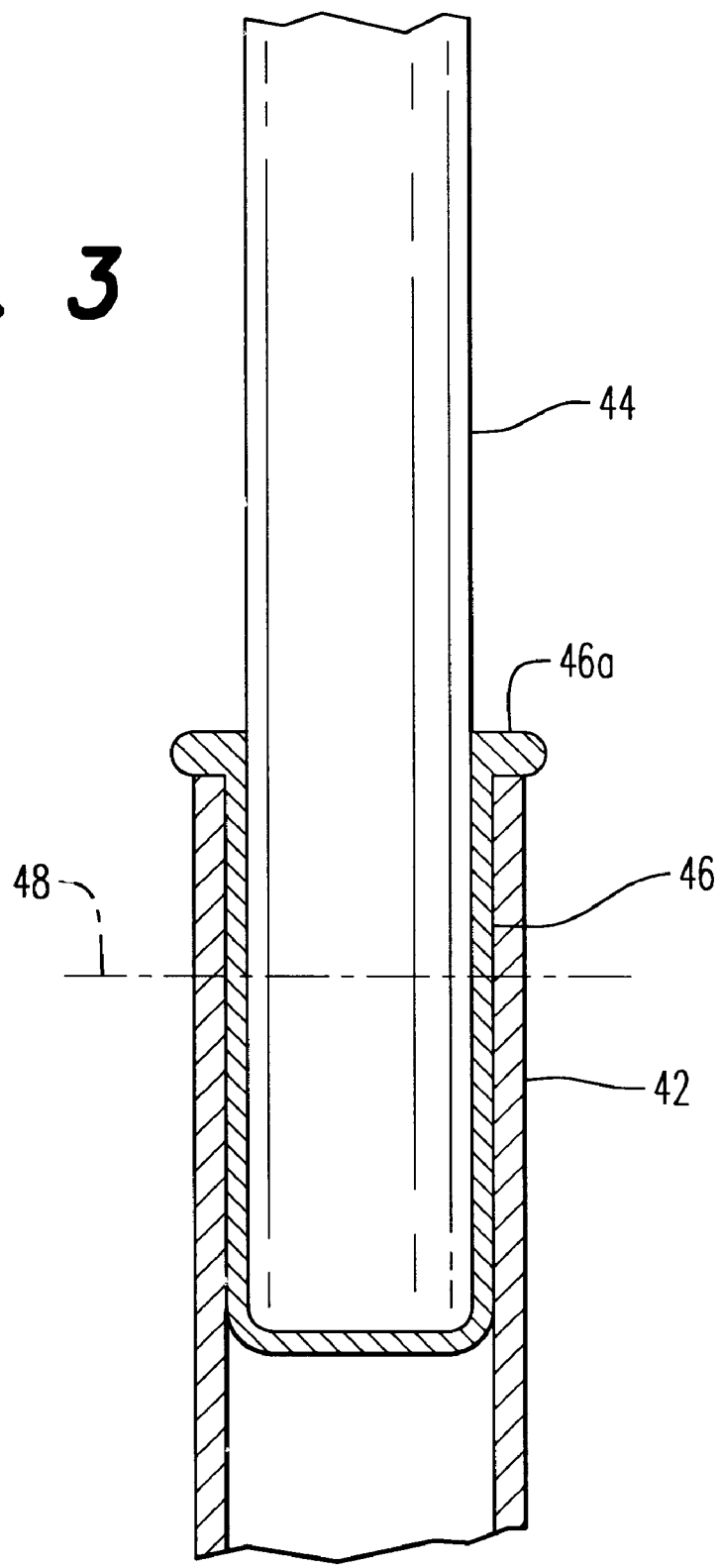

VEHICLE TRAILER HITCH FLAG DISPLAY APPARATUS

BACKGROUND OF THE INVENTION

1. Scope of Invention

This invention relates generally to decorative flag and banner display devices supportable on a vehicle and more particularly to a display flag and support apparatus arrangement connectable to a towing ball, when removed, of a conventional trailer hitch in any form.

2. Prior Art

Popularity of display banners and flags has grown rapidly as more sports events, college support and professional team support has also gained in popularity. Display flags and banners bearing college, high school and professional team logos and names are also a very lucrative commodity for the respective trademark holders and generate additional enthusiasm by both participants and fans.

A flexible safety mast mounting invented by Asciutto in U.S. Pat. No. 4,632,354 teaches a mast mounting arrangement for supporting a mast and safety flag or communication antenna. The assembly releasably attaches to a rear frame portion of an all terrain vehicle.

In U.S. Pat. No. 5,669,621, a vehicle alignment device has been invented by Lockwood which utilizes the trailer hitch tongue and the tongue of the trailer for providing a mounting surface for mating alignment of flags which assist the driver of the vehicle in connecting the trailer to the trailer hitch.

Another trailer hitch guide system has been invented by Heinecke in U.S. Pat. No. 6,042,136. This guide system includes a trailer hitch having an inboard end coupled to the frame of the vehicle and an outboard end of the trailer hitch which includes a conventional trailer ball. An upright mast or shaft is releasably connectable to the end of the trailer hitch to facilitate alignment of the vehicle as it is backed into place with respect to the boat trailer.

In U.S. Pat. No. 5,732,927, Purpura teaches a vehicle flag mounting assembly for the fender structure of a motorcycle. The structure of the motorcycle fender includes a license plate assembly and spaced plural mast support members.

Another trailer hitch alignment device is disclosed by Talcott in U.S. Pat. No. 5,680,706. Again, the intention of the Talcott invention is to utilize the vehicle and boat trailer structure to provide support and use of an alignment structure which is unique to this patent.

The following additional U.S. patent teachings provide detailed structure for supporting a display flag on other portions of a vehicle as follows:

U.S. Pat. No. 4,601,255 issued to Marcotti
U.S. Pat. No. 1,564,703 issued to Nichols
U.S. Pat. No. 1,928,563 issued to Hetzel
U.S. Pat. No. 1,279,669 issued to Deming
U.S. Pat. No. 3,493,203 issued to Gualano
U.S. Pat. No. 3,643,902 issued to Gualano
U.S. Pat. No. 5,039,056 issued to Paxton
U.S. Pat. No. 4,650,147 issued to Griffin
U.S. Pat. No. 5,524,857 issued to Eisenberg, et al.
U.S. Pat. No. 6,085,687 issued to Chester The following U.S. Patents disclose devices for holding diverse articles on various structural portions of vehicles, including front and back trailer hitches:

U.S. Pat. No. 5,205,446 issued to Greenberg
U.S. Pat. No. 2,533,837 issued to Pauley
U.S. Pat. No. 4,676,414 issued to Deguevara
U.S. Pat. No. 5,558,352 issued to Mills
U.S. Pat. No. 4,955,577 issued to Ching Lastly, prior art further teaches a number of devices for supporting a display type flag using various indicia formed thereon which are not related to vehicle support structure as follows:

U.S. Pat. No. 5,899,167 issued to Furman
U.S. Pat. No. 4,574,726 issued to Sullivan

BRIEF SUMMARY OF THE INVENTION

This invention is directed to a detachable vehicle trailer hitch display flag apparatus, the trailer hitch of the type having a removable towing ball. The apparatus comprises an elongated preferably tubular flagstaff having a display flag attached or releasably attachable to an upper end portion thereof and an elongated straight support shaft adapted at a lower end thereof to be releasably attachable to the trailer hitch in upwardly extending and upright orientation in place of the towing ball when it is removed. A lower end of the flagstaff is slidably engageable to the support shaft in coaxial upwardly extending alignment with the support shaft. A releasable locking arrangement holds the flagstaff and the support shaft together while the apparatus is in use.

It is therefore an object of this invention to provide a flagstaff apparatus which is easily connectable to an existing trailer hitch structure, providing for the easy releasable attachment and detachment of the flagstaff and associated display flag as an assembly of the apparatus.

It is another object of this invention to provide a display flag apparatus which provides the economy of utilizing an existing trailer hitch structures with the removal of the towing ball from the trailer hitch.

In accordance with these and other objects which will become apparent hereinafter, the instant invention will now be described with reference to the accompanying drawings.

BRIEF DESCRIPTION OF THE DRAWINGS

FIG. 3 is a side elevation view of a portion of an alternate embodiment of the invention.

DETAILED DESCRIPTION OF THE INVENTION

Figure 1:
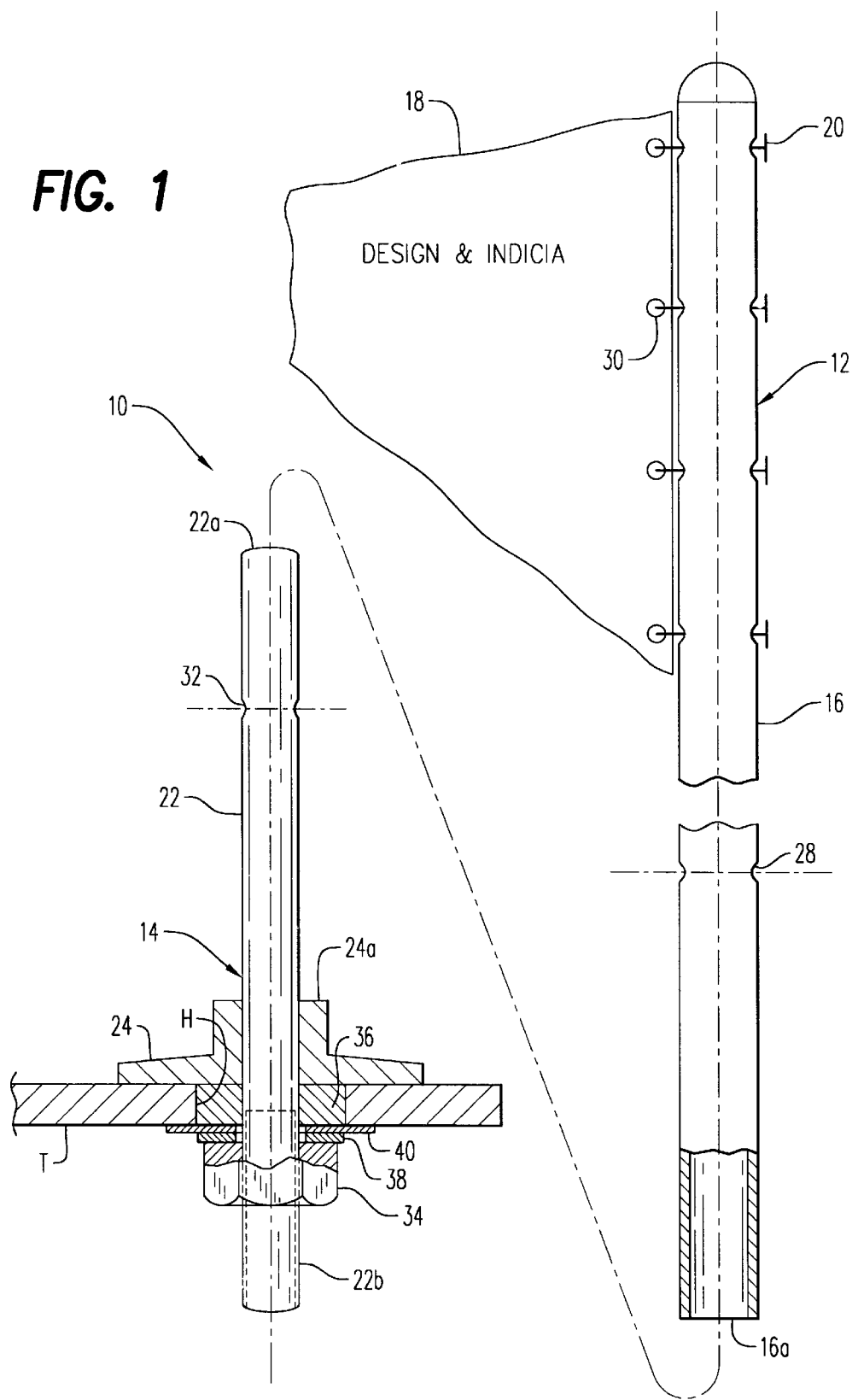
FIG. 1 is a side elevation exploded partially broken view of the invention attached to a rearwardly extending tongue member of a conventional trailer hitch.

Referring now to the drawings, the invention is generally shown at numeral 10 in both figures. This apparatus 10 includes a flagstaff assembly 12 and an elongated support shaft assembly 14. The flagstaff assembly 12 includes an elongated tubular flagstaff 16 and a display flag 18 connected to an upper end portion of the flagstaff 16 by releasable connectors 20 attached through grommets 30 spaced along the inboard upright edge of the display flag 18. Note that any conventional mechanism for attaching the display flag 18 to the upper end of the flagstaff 16 is intended to be within the scope of this invention when referred to as such.

The support shaft assembly 14 includes an elongated straight support shaft 22 which is rigidly connected or made as a unit with, a flanged member 24 and integral support boss 24a. The flange 24 is positioned against an upper generally horizontal surface of the rearwardly extending tongue portion T of a conventional trailer hitch shown in FIG. 2.

It is a primary aspect of this invention to utilize an existing hole H which is formed into the tongue T sized to receive the threaded shank of a conventional towing ball. The towing ball (not shown) is slidably engaged and secured through the hole H by a threaded jam nut similar to that shown at 34 in FIG. 1. However, due to the load requirements placed on the towing ball (not shown), its mounting shaft is typically substantially larger in diameter than necessary to accommodate the structural needs of the present invention.

To that effect, a collar or spacer 36 is also provided, where required, which, on its outer periphery or diameter, matably engages in slidable fashion within hole H. The collar 36 has a central aperture for receiving in snug sliding fashion the lower portion 22b of the support shaft 22. This arrangement is locked in place with respect to the tongue T by placing the support shaft 22 through the collar 36 when positioned within hole H. A conventional washer 40 and a lock washer 38 are positioned against the lower surface of the tongue T and the entire arrangement locked together by threaded nut 34 on threads 22b.

The diameter of the support shaft 22 is sized to slidably engage in close mating fashion within the tubular inside diameter of flagstaff 16. Insertion of the upper end 22a of the support shaft 22 into the lower end 16a of the flagstaff 16 allows the slidable engagement therebetween so that the lower end 16a mates against and receives support from the upper surface of boss 24a.

Figure 2:
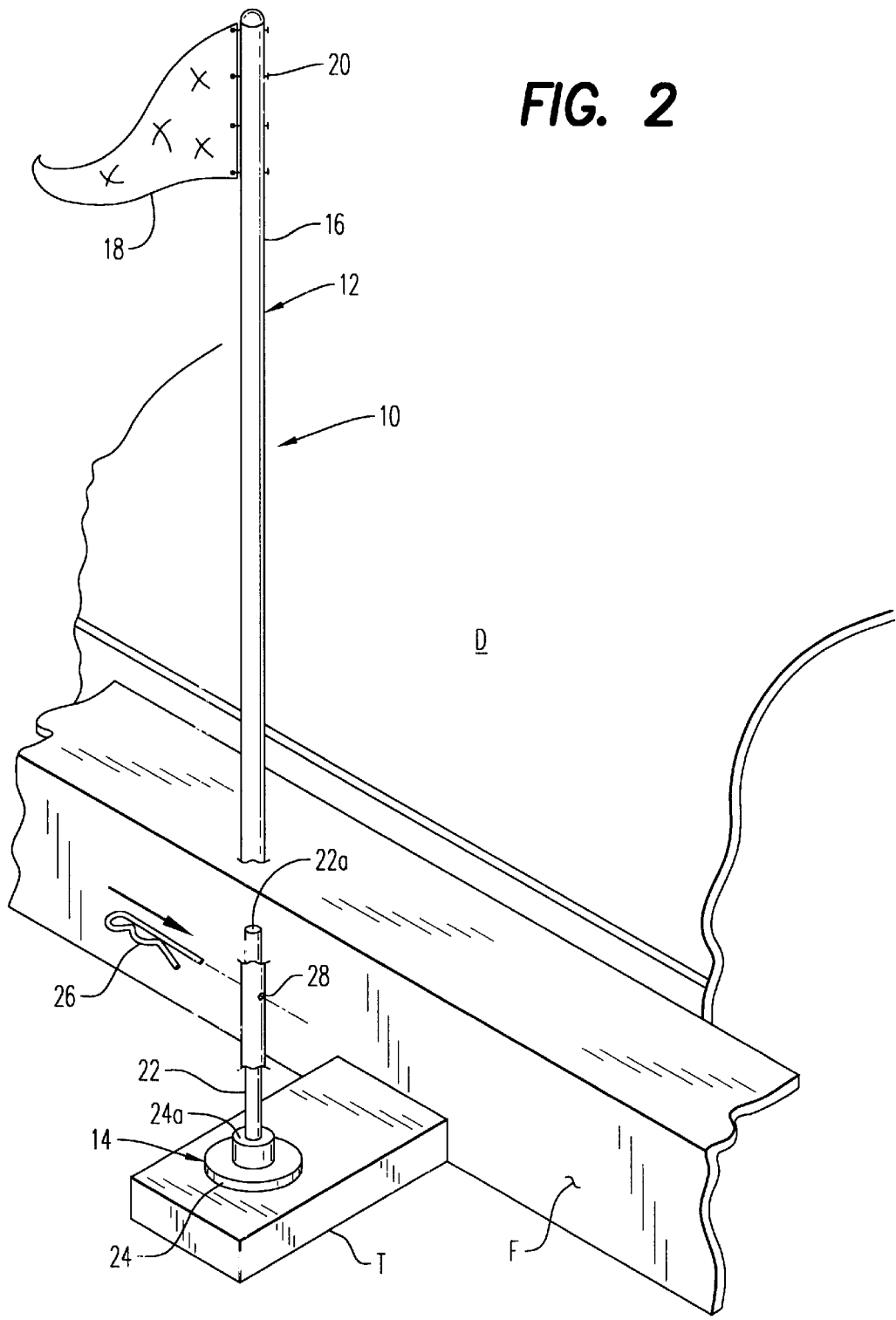
FIG. 2 is a perspective view of FIG. 1 showing more of the rear section of the towing vehicle to which the trailer hitch is attached.

After the flagstaff assembly 12 has been so positioned onto the support shaft assembly 14 as shown in FIG. 2, a locking pin 26 of a conventional nature is slidably and lockably engaged through the now mating and aligned apertures 28 of flagstaff 16 and 32 of support shaft 22. Any conventional locking structure for releasable attachment between the flagstaff 16 and the support shaft 22 when so interengaged for use is envisioned within the scope of this invention.

Typically, the support shaft 22 will be substantially shorter in length than that of the flagstaff 16 so that the display flag 18 will be positioned at a reasonable height with respect to the top of the vehicle. However, when the rear door D of a vehicle of this type is opened, the length of the support shaft 22 is sufficiently short so that the upper end 22a does not extend above a certain level of the frame F and body structure so that the rear door D would impact or infringe or otherwise make damaging contact with the upper end 22a. This same clearance beneficial feature applies where the vehicle has a tailgate, a trunk or a hatchback.

Referring now to FIG. 3, an alternate embodiment of the invention with respect to the interconnection and structure between the lower end of the flagstaff 44 and the upright support shaft 42 is there shown. The upper end of the support shaft 42 is hollow or tubular, while the flagstaff 44 is solid in nature such as a fiberglass fishing pole structure. An intermediate ferrel 46 which is permanently attached to the lower end of the flagstaff 44 slidably engages into the support shaft 42 as shown. A flange 46a of ferrel 46 prevents over insertion. A releasable pin along axis 48 releasably interconnecting these two members as shown is also provided; however, a frictional fit will suffice to maintain this interconnection during use.

While the instant invention has been shown and described herein in what are conceived to be the most practical and preferred embodiments, it is recognized that departures may be made therefrom within the scope of the invention, which is therefore not to be limited to the details disclosed herein, but is to be afforded the full scope of the claims so as to embrace any and all equivalent apparatus and articles.

What is claimed is:

1. A detachable vehicle trailer hitch display flag apparatus, and a trailer hitch of the type having a removable towing ball attached through a hole formed in a rearwardly extending tongue of the trailer hitch, said apparatus comprising:

an elongated tubular flagstaff having a display flag attached or releasably attachable to an upper end portion thereof;

an elongated straight support shaft having a length substantially shorter in length than that of said flagstaff, said support shaft adapted at a lower end thereof for releasable attachment through the hole in the tongue of the trailer hitch in an upwardly extending and upright orientation after the towing ball is removed;

a lower end of said flagstaff slidably engageable with said support shaft in coaxial upwardly extending alignment with said support shaft;

a locking member for releasably securing said flagstaff and said support shaft together while said apparatus is in use.

2. A detachable vehicle trailer hitch display flag apparatus, and a trailer hitch of the type connected to a rear frame of a vehicle and having a removable towing ball removably bolted through a mounting hole formed in a rearwardly extending support tongue of the trailer hitch, said apparatus comprising:

an elongated tubular flagstaff having a display flag attached or releasably attachable to an upper end portion thereof;

an elongated straight support shaft having a threaded cylindrical lower end thereof releasably attachable through the mounting hole in the support tongue in a upwardly extending and upright orientation after the towing ball is removed;

a flat cylindrical collar having an outside periphery sized for snug slidable insertion into the mounting hole and an inside aperture sized for slidable insertion of said lower end therethrough, said collar having a thickness no greater than that of the support tongue;

a lower end of said flagstaff slidably engageable with said support shaft in coaxial upwardly extending alignment with said support shaft;

a locking member which, when installed, releasably secures said flagstaff and said support shaft together while said apparatus is in use.

3. In combination with a detachable display flag apparatus, a vehicle trailer hitch of the type connected to a rear frame of a vehicle and having a removable towing ball removably connected through a mounting hole formed in a rearwardly extending support tongue of said trailer hitch, said apparatus comprising:

an elongated tubular flagstaff having a display flag attached or releasably attachable to an upper end portion thereof;

an elongated straight support shaft having a threaded cylindrical lower end thereof releasably attachable through said mounting hole in said support tongue in a upwardly extending and upright orientation after said towing ball is removed;

a flat cylindrical collar having an outside periphery sized for snug slidable insertion into said mounting hole and an inside aperture sized for slidable insertion of said lower end therethrough, said collar having a thickness no greater than that of said support tongue;

a lower end of said flagstaff slidably engageable with said support shaft in coaxial upwardly extending alignment with said support shaft;

a locking member which, when installed, releasably secures said flagstaff and said support shaft together while said apparatus is in use.

4. A detachable vehicle trailer hitch display flag apparatus and a trailer hitch of the type which is attached to the rear of a vehicle having a removable towing ball connected into a mounting hole in a tongue of the trailer hitch comprising:

an elongated tubular flagstaff having a display flag attached or releasably attachable to an upper end portion of said flagstaff;

an elongated straight support shaft having a lower end thereof releasably attached into the mounting hole in a upwardly extending and upright orientation after the towing ball is removed;

a lower end of said flagstaff slidably engageable to said support shaft in coaxial upwardly extending alignment with said support shaft;

locking means for releasably locking said flagstaff and said support shaft together while said apparatus is in use.

* * * * *